United States Patent
Jaquay

[11] 4,102,676
[45] Jul. 25, 1978

[54] METHOD FOR RECOVERING LEAD FROM BATTERY MUD

[75] Inventor: Louis H. Jaquay, Pittsburgh, Pa.

[73] Assignee: Dravo Corporation, Pittsburgh, Pa.

[21] Appl. No.: 781,112

[22] Filed: Mar. 25, 1977

[51] Int. Cl.² ............................................. C22B 13/02
[52] U.S. Cl. ..................................................... 75/77
[58] Field of Search .................... 75/77; 266/188, 221

[56] References Cited

U.S. PATENT DOCUMENTS

| | | | |
|---|---|---|---|
| 1,315,460 | 9/1919 | Blackwell | 266/188 X |
| 1,888,164 | 11/1932 | Freeman | 75/77 |

FOREIGN PATENT DOCUMENTS

| | | | |
|---|---|---|---|
| 2,600,384 | 7/1976 | Fed. Rep. of Germany | 75/77 |

Primary Examiner—M. J. Andrews
Attorney, Agent, or Firm—Parmelee, Miller, Welsh & Kratz

[57] ABSTRACT

A method and apparatus for recovering lead from worn out electric storage batteries in which finely divided dried battery mud is injected into a stream of air through the veni contracta of a venturi in an air conduit. A reducing gas and oxygen are successively introduced into the stream through apertures in the walls of the conduit communicating with annular chambers in fuel and oxygen manifolds surrounding the conduit in sufficient quantities to maintain a stable reducing flame. The droplets of metallic lead and slag which fall from the reducing flame are collected in a refractory lined chamber and separated in a conventional manner.

3 Claims, 1 Drawing Figure

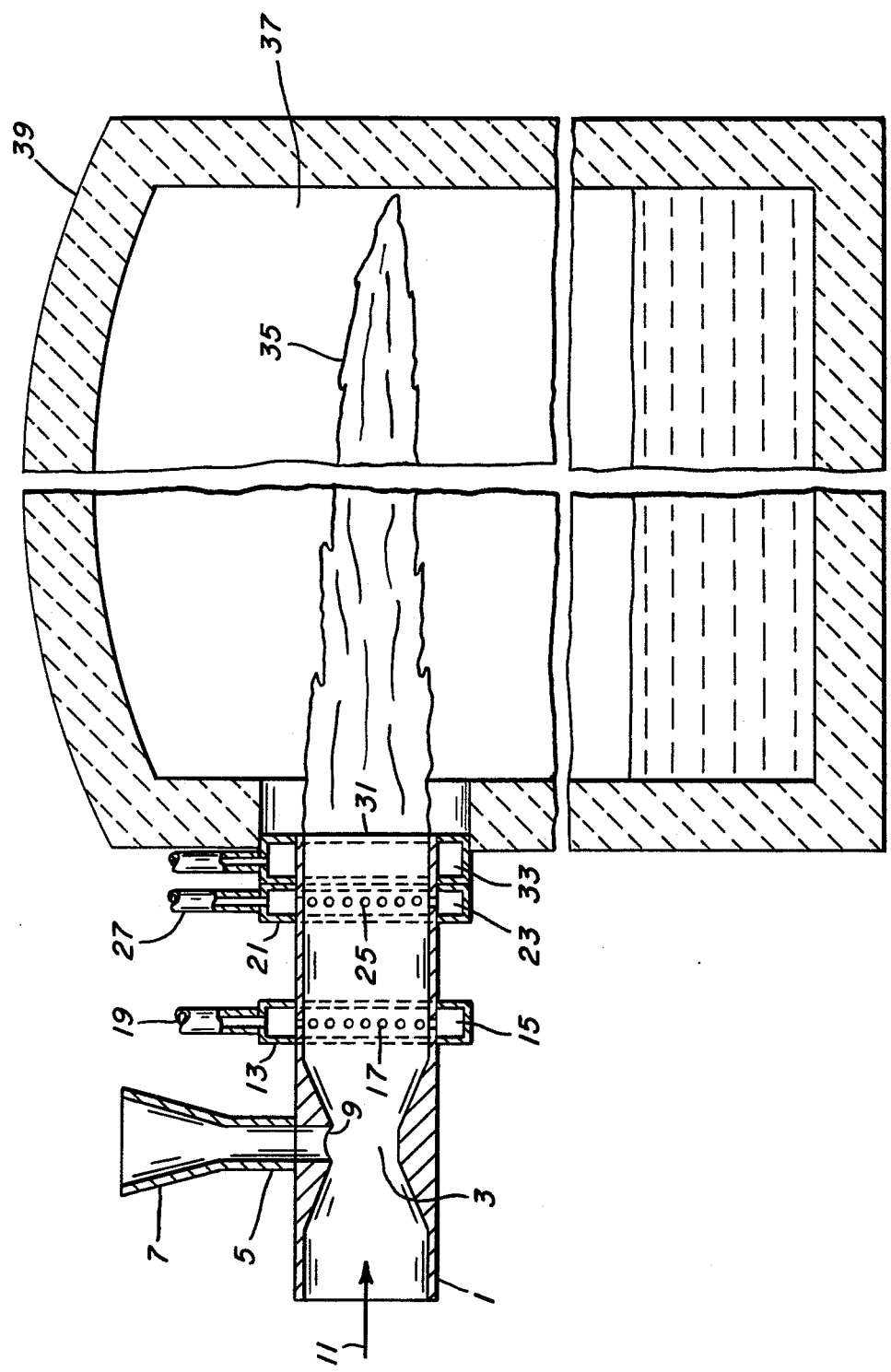

METHOD FOR RECOVERING LEAD FROM BATTERY MUD

BACKGROUND OF THE INVENTION

1. Field of the Invention

The invention relates to a method and apparatus for recovering metallic lead from "battery mud" and more particularly to reducing the finely divided lead compounds directly in a reducing flame.

2. Prior Art

A significant part of the lead used for commercial purposes is reclaimed from worn out electrical storage batteries. During the reclaiming operation, the lead compounds which form the active material on the plates are recovered as a thick paste commonly called battery mud. Conventionally, this paste is dried, agglomerated and smelted in a reverberatory furnace where the lead compounds are reduced to lead. It is usually desirable to remove most of the sulfates by reaction with ammonium carbonate to avoid the production of $SO_2$ in the furnace gases. The necessity of agglomerating the battery mud adds to the time and cost required to extract metallic lead from the battery mud.

It has been suggested in U.S. Pat. No. 3,862,834 that finely divided iron ores can be reduced by forming the dust into a cloud, transporting the cloud in reducing gas, reacting the cloud with the gas for enriching the dust, and then introducing the transported cloud into the plasma stream of a plasma burner directed at the bath of a melting furnace. It has also been suggested in U.S. Pat. No. 3,459,415 that finely granulated copper-bearing sulfidic materials can be introduced into a converter where they are subsequently melted and reduced by injecting them through a pipe coaxially mounted inside a second larger pipe carrying a pressurized oxidizing gas. The stated purpose in this instance of introducing the oxidizing gas with the ore concentrates is to promote a separation of the materials in the converter into distinct layers.

U.S. Pat. No. 3,463,472 discloses apparatus for continuous direct smelting of ores in which a continuous flow of molten material is promoted between various zones within a furnace by jets of oxygen. In one embodiment, prereduced, finely divided ores mixed with powdered coal are introduced into the furnace through a water-cooled feeder-burner. The feeder-burner comprises a central pipe through which the fines are fed at sufficient velocity to penetrate the slag layer and two concentric rings of pipes surrounding the central pipe. Oil or propane and air or oxygen are directed from the concentric rings of pipes parallel to the stream of fines to produce a flame which restores the heat lost from the fines during transport from the prereducer to the furnace and to aid in circulation of the molten material in the furnace.

SUMMARY OF THE INVENTION

According to the invention, metallic lead is recovered from battery mud by drying, and preferably screening, the mud to produce fine particulate material, entraining the fine particulate material in a stream of air, injecting a carbon and hydrogen containing fuel gas into the stream of air and fine particulate material around the periphery thereof and injecting oxygen into the fuel rich stream in sufficient quantities to ensure a stable flame and to maintain a sufficiently high temperature under strong reducing conditions for rapid reaction. Preferably, the reducing gas and oxygen are injected radially inward into the stream of air and fine particulate material around the periphery thereof.

Apparatus suitable for carrying out the invention comprises a conduit through which air is introduced. Finely divided dried battery mud is fed into the conduit where it becomes entrained in the air through a feed tube which communicates with the conduit at the veni contracta of a venturi provided at an intermediate portion of the conduit. An annular chamber of a gaseous fuel manifold surrounds the conduit downstream of the venturi. Gaseous fuel from the manifold is introduced into the conduit through a plurality of apertures angularly distributed about the wall of the conduit. An oxygen manifold having an annular chamber surrounding the conduit downstream of the fuel manifold introduces oxygen into the conduit through a plurality of second apertures in the walls of the conduit which communicate with the oxygen manifold.

In this manner the finely divided battery mud is melted and reduced by the intense heat and strongly reducing conditions created by the partial combustion of the fuel gas and the droplets of lead and slag fall into a refractory lined vessel situated below the flame. This improved method of recovering metallic lead from battery mud, which eliminates the need to agglomerate finely divided mud, is faster and more economical than prior art methods.

BRIEF DESCRIPTION OF THE DRAWING

The drawing is a vertical section through apparatus suitable for practicing the invention.

DESCRIPTION OF THE PREFERRED EMBODIMENT

In accordance with the invention, the lead compounds which form the active material on the plates of worn out electrical storage batteries are removed as a thick paste, commonly called battery mud. These compounds include lead sulfate, basic lead sulfate and lead oxide. The mud is preferably treated with ammonium carbonate to remove the sulfur and thereby eliminate it from the stack gases. The treated paste is next dried and screened, preferably to remove particles larger than 100 mesh. The finely divided dried battery mud is then entrained in air. A reducing gas, such as methane, is then injected into the stream of air and finely divided material around the periphery thereof to produce a fuel rich mixture. Next, oxygen is injected into the fuel rich mixture, again around the periphery thereof, in sufficient quantity to ensure a stable flame and to maintain reducing conditions at a high temperature. Injection of the reducing gas and oxygen radially inward into the stream of air and finely divided dried battery mud produces thorough mixing such that all of the particles of battery mud are melted and reduced to metallic lead quickly while still suspended in the reducing flame. The droplets of metallic lead and slag can then be collected in a refractory lined vessel where they separate and can be tapped off in a conventional manner.

Suitable parameters for a pilot plant test model for carrying out the invention would be 75 to 120 pounds per minute of dried and screened battery mud, 650 to 750 SCFM of air, 75 to 120 SCFM of natural gas and 15 to 25 SCFM of 90%-plus oxygen. These proportions when introduced into a two inch diameter conduit produce a stable flame with sufficient temperature to completely reduce the lead compounds while they are still suspended in the flame.

Apparatus suitable for carrying out the invention is illustrated in the drawing. The air is introduced through a conduit 1 having a venturi 3 located at an intermediate point thereof. A feed tube 5 having a flared end 7 for receiving finely divided dried battery mud communicates with the conduit 1 at the veni contracta 9 of the venturi 3. The finely divided dried battery mud which is fed through the feed tube 5 becomes entrained in the air introduced in the direction of the arrow 11 into the conduit 1.

Downstream of the venturi 3 is a fuel manifold 13 having an annular chamber 15 which surrounds the conduit and communicates therewith through a plurality of angularly distributed apertures 17 in the wall of the conduit 1. Natural gas, or any other suitable reducing gas, is introduced into the annular chamber 15 of fuel manifold 13 through supply line 19.

Downstream of the fuel manifold 13 is an oxygen manifold 21 which also has an annular chamber 23 surrounding the conduit and communicating therewith through a plurality of second apertures 25 in the walls of the conduit. Oxygen of 90%-plus purity is supplied to the annular chamber 23 of the oxygen manifold through supply line 27 in sufficient quantity to ensure a stable flame and to maintain the proper flame temperature for reduction of the mud (about 2100° to 2500° F).

The distance between the apertures in the fuel manifold and the oxygen manifold and the number and diameter of holes in each set are selected to give a fuel rich layer against the burner wall by the time that the mixture reaches the oxygen manifold apertures. The injection of oxygen into this fuel rich layer provides a layer which burns with a high propagation rate and a high temperature which maintains a stable flame envelope for conducting the reduction reactions in the central part of the flame. As an example, these conditions should be met in a burner with a two inch diameter conduit by locating the fuel apertures 17 about two inches downstream of the veni contracta 9 of the venturi 3 and the oxygen apertures 25 about another two inches downstream of the fuel apertures.

In order to protect the tip 31 of the conduit 1 from the high temperature of the reducing flame, cooling water is circulated through an annular chamber 33 surrounding the tip 31. Even with water cooling, the distance between the oxygen injection apertures 25 and the tip 31 of the conduit must be short, on the order of $\frac{1}{2}$ inch, to prevent destruction of the burner tip.

The burner flame 35, carrying with it the finely divided dried battery mud, projects into a chamber 37 of a refractory lined vessel 39. The droplets of metallic lead and slag fall into a pool at the bottom of the chamber 37 where they separate into layers which can be separately tapped in a conventional manner.

Recovery of metallic lead from worn out electric storage batteries in accordance with the teachings of this invention is simple, fast and economical.

I claim:

1. A method of producing metallic lead from battery mud comprising the steps of:
    drying the battery mud to produce a fine particulate material;
    entraining the fine particulate material in a stream of air;
    injecting a reducing gas into the stream of air and fine particulate material around the periphery thereof to produce a reducing flame;
    injecting oxygen into the fuel rich periphery of the stream of air and fine particulate material in sufficient quantity to ensure a stable flame and to maintain reducing temperature; and
    collecting the droplets of lead which fall from the reducing flame.

2. The method of claim 1 wherein the reducing gas and oxygen are injected radially inward into the stream of air and fine particulate material around the periphery thereof.

3. The method of claim 1 wherein the dried battery mud is screened to remove particles above 100 mesh.

* * * * *